(12) United States Patent
George et al.

(10) Patent No.: US 7,494,694 B2
(45) Date of Patent: Feb. 24, 2009

(54) SINGLE-COMPONENT ADHESIVE SILICONE ELASTOMER COMPOSITION WHICH CAN BE CROSSLINKED BY POLYADDITION

(75) Inventors: Catherine George, Saint Genis-les-Ollières (FR); Alain Pouchelon, Meyzieu (FR); Fabio Zanandrea, Lyons (FR); Sébastien Sterin, Saint Cyr au Mont d'Or (FR)

(73) Assignee: Rhodia Chimie, Aubervilliers (FR)

( * ) Notice: Subject to any disclaimer, the term of this patent is extended or adjusted under 35 U.S.C. 154(b) by 327 days.

(21) Appl. No.: 10/537,782

(22) PCT Filed: Nov. 25, 2003

(86) PCT No.: PCT/FR03/03476

§ 371 (c)(1),
(2), (4) Date: Jan. 4, 2006

(87) PCT Pub. No.: WO2004/061003

PCT Pub. Date: Jul. 22, 2004

(65) Prior Publication Data

US 2006/0128881 A1    Jun. 15, 2006

(30) Foreign Application Priority Data

Dec. 4, 2002    (FR) .................. 02 15270

(51) Int. Cl.
B05D 3/02    (2006.01)
C08L 83/04    (2006.01)

(52) U.S. Cl. ................. 427/387; 524/129; 524/133; 524/135; 524/147; 524/588; 525/477; 525/478; 528/15; 528/31; 528/32

(58) Field of Classification Search .............. None
See application file for complete search history.

(56) References Cited

U.S. PATENT DOCUMENTS

| | | | |
|---|---|---|---|
| 2,823,218 A | 2/1958 | Speier et al. | |
| 2,938,009 A | 5/1960 | Lucas | |
| 3,159,601 A | 12/1964 | Ashby | |
| 3,159,602 A | 12/1964 | Hamilton et al. | |
| 3,220,972 A | 11/1965 | Lamoreaux | |
| 3,419,593 A | 12/1968 | Willing | |
| 3,445,420 A | 5/1969 | Kookootsedes et al. | |
| 3,615,972 A | 10/1971 | Morehouse, Jr. et al. | |
| 3,715,334 A | 2/1973 | Karstedt | |
| 3,723,497 A | 3/1973 | Baney | |
| 3,775,452 A | 11/1973 | Karstedt | |
| 3,814,730 A | 6/1974 | Karstedt | |
| 4,184,006 A | 1/1980 | Hockemeyer et al. | |
| 4,256,870 A | 3/1981 | Eckberg | |
| 4,347,346 A | 8/1982 | Eckberg | |
| 4,504,645 A | 3/1985 | Melancon | |
| 4,530,989 A | 7/1985 | Michel et al. | |
| 4,687,870 A | 8/1987 | Cavezzan | |
| 4,699,813 A | 10/1987 | Cavezzan | |
| 4,741,966 A | 5/1988 | Cavezzan | |
| 5,380,812 A | 1/1995 | Lutz et al. | |
| 5,696,210 A * | 12/1997 | King et al. | ................. 525/478 |
| 6,300,455 B1 | 10/2001 | Haselhorst et al. | |
| 6,346,562 B1 * | 2/2002 | Haselhorst et al. | .......... 524/106 |
| 6,391,944 B2 | 5/2002 | Canpont et al. | |
| 7,151,149 B1 | 12/2006 | Barrandon et al. | |
| 2001/0034402 A1 | 10/2001 | Canpont et al. | |

FOREIGN PATENT DOCUMENTS

| | | |
|---|---|---|
| AU | 716 990 B | 3/1997 |
| EP | 0 057 459 B1 | 1/1985 |
| EP | 0 182 611 A2 | 5/1986 |
| EP | 0 190 530 B1 | 10/1988 |
| EP | 0 188 978 B1 | 9/1989 |
| EP | 0 516 282 A1 | 12/1992 |
| EP | 0 761 759 A2 | 3/1997 |
| EP | 1 064 324 B1 | 7/2003 |
| FR | 1 126 884 | 12/1956 |
| FR | 1 136 885 | 5/1957 |
| FR | 1 236 505 | 7/1960 |
| FR | 1 528 464 | 6/1968 |
| FR | 2 372 874 A1 | 6/1978 |
| FR | 2 775 981 A1 | 9/1999 |
| FR | 2 791 994 A1 | 10/2000 |
| GB | 1 024 234 | 3/1966 |
| WO | 98/58997 A1 | 12/1998 |
| WO | 99/32552 A2 | 7/1999 |
| WO | 00/60011 A1 | 10/2000 |
| WO | 03/092890 A2 | 11/2003 |

* cited by examiner

Primary Examiner—Marc S Zimmer
(74) Attorney, Agent, or Firm—Buchanan, Ingersoll & Rooney, PC

(57) ABSTRACT

The invention relates to adhesive silicone elastomer compositions which can be crosslinked by polyaddition. The composition, crosslinkable by polyaddition (hydrosilylation), comprises: α/ at least one polyorganosiloxane (POS) bearing ethylenic and/or acetylenic unsaturations [POS with ≡Si-(unsaturated) units]; β/ at least one polyorganosiloxane (POS) with ≡Si—H units; γ/ a catalytic combination comprising γ.1 at least one metallic catalyst (preferably platinum based), γ.2 and at least one crosslinking inhibitor; δ/ a filler; ε/ at least one adhesion promoter; ρ/ at least one POS resin; λ/ at least one thermal resistance agent; and φ/ optionally at least one other functional additive. Methods of making and using the subject composition are also described.

20 Claims, No Drawings

SINGLE-COMPONENT ADHESIVE SILICONE ELASTOMER COMPOSITION WHICH CAN BE CROSSLINKED BY POLYADDITION

CROSS-REFERENCE TO RELATED APPLICATIONS

This application is the U.S. national stage of International Appln. No. PCT/FR2003/003476, filed Nov. 25, 2003, claiming priority under 35 U.S.C. §119 of Patent Application No. 02/15270, filed in France on Dec. 4, 2002, expressly and entirely incorporated by reference herein and relied upon.

The general field of the invention is that of silicone elastomer compositions which can be vulcanized under hot conditions (Room Temperature Vulcanizing, RTV, or Liquid Silicone Rubber, LSR) by polyaddition (hydrosilylation) reactions involving polyorgano-siloxanes (POSs) carrying $\equiv$Si—H units and POSs carrying ethylenic and/or acetylenic unsaturation(s), hereinafter denoted by POSs carrying $\equiv$Si—[unsaturation] units, in the presence of a catalytic combination comprising at least one metal catalyst (preferably based on platinum) and at least one inhibitor. These compositions can be of the single- or two-component type.

A subject matter of the present invention is thus a novel single-component self-adhesive Adhesive Silicone Elastomer (ASE) composition of "consistent" rheology which can be crosslinked under hot conditions by polyaddition according to high kinetics and which has good thermal stability in the crosslinked state.

The present invention is also targeted at the application of this Adhesive Silicone Elastomer (ASE) composition in the manufacture of adhesives or seals in situ, such as flowed gasket seals, profiled seals and injection-molded or overmolded seals.

It can relate in particular to an adhesive which makes possible the assembling (under hot conditions) of various substrates, for example made of metal, glass or plastic and the like, it being possible for the substrates to be in the same material or in a different material.

In these applications, it is advisable to have available a crosslinkable elastomer composition possessing rheological properties such that they can be easily formed and/or applied to substrates to be assembled and/or to be sealed (suitable rheology), on the one hand, and such that it is capable of retaining the form which has been given to them, at least for the time necessary for the crosslinking, which makes it possible to definitively fix the memory of the targeted form. The crosslinkable silicone elastomer pastes in this rheological state may be described as flowing or pumpable. Such a rheological behavior is particularly welcome in adhesive bonding, in situ seal forming, molding and stamping/tampography applications, inter alia. In the case of textile components to be adhesively bonded, this rheology makes it possible to prevent excessively great impregnation of the fabric by the adhesive.

Still as regards the adhesive bonding but this time in particular in the field of domestic electrical appliances, where industrial manufacturing rates are very high, it is in particular entirely desirable for:

the ASE adhesive to have a rheology suited to the deposition and assembling operations carried out at these high rates and more specifically for it to make it possible in particular to move (or handle) the assembled components before the adhesive has set (crosslinking), without this causing the assembled components to slip in an undesirable way with respect to one another;

the ASE adhesive to have rapid crosslinking kinetics under hot conditions which are thus compatible with high manufacturing rates;

the ASE adhesive to be thermally stable in the crosslinked state (essential property, in particular for oven door adhesive bonding);

the ASE adhesive to be self-adhesive on the substrates to be assembled;

and, finally, this ASE adhesive to be convenient to handle.

On this final point, it is clear that a single-component formulation which is stable on storage is markedly better than a two-component formulation for polyaddition under hot conditions, which nevertheless remains the commonest in practice.

After crosslinking, the adhesive is sufficiently stable thermally to be able to be applied in the adhesive bonding of oven doors.

In attempting to achieve these rheological characteristics, provision has been made to use thixotropic agents which make it possible to thicken, in a full measure, silicone elastomer compositions without, however, affecting their malleability or their fluidity necessary for their handling and for their forming. Mention may be made, among conventional thixotropic agents which can be used, of systems based on amines (polymer chain, preferably silicone chain, grafted with primary amine or secondary amine functional groups) or on polyglycols. These conventional thixotropic agents have not made it possible to date to satisfactorily thicken all silicone polyaddition formulations and thus to open advantageous prospects in applications for which this characteristic is essential.

It is known to thicken peroxide-cured heat-curable elastomers (HCEs) using PolyTetraFluoroEthylene (PTFE) sold under the Teflon® trademark.

Furthermore, French patent FR-B-2 791 994 discloses a self-adhesive silicone elastomer composition, cross-linkable by polyaddition, having a nonflowing rheological behavior of the type of those comprising polyorganosiloxanes (POSs) carrying $\equiv$Si—($C_2$-$C_6$ alkenyl) units and $\equiv$Si—H units and polytetrafluoroethylene (PTFE: Teflon®) as thixotropic agent. The applications targeted for this composition are: molding, stamping, tampography, preparation of seals in situ and adhesive bonding, in particular of textiles.

This composition can in particular comprise a two-component composition formed of carefully mixed parts $P_1$ and $P_2$. $P_1$ comprises POS resin with the structure $MM^{Vi}DD^{Vi}Q$ made of: $(CH_3)_3SiO_{0.5}$ (M units), $(CH_3)_2ViSiO_{0.5}$ ($M^{Vi}$ units), $(CH_3)_2SiO$ (D units) and $SiO_2$ (Q units); a POS: PolyDiMethylSiloxane comprising $(CH_3)_2ViSiO_{0.5}$ units, a diatomaceous earth filler (Celite® 350), magnesium oxide powder, butyl orthotitanate, which is one of the three components of an adhesion promoter, a platinum metal catalyst in the form of a metal complex, known under the name of Karstedt catalyst, and another filler formed of a powdery mixture based on Teflon (DuPont, Resin T CN®) and on 50 ground quartz (Sifraco C-600). $P_2$ has the same composition as $P_1$, with the exception of the catalyst, and additionally comprises a poly (dimethyl)(hydromethyl)siloxane, blocked by $(CH_3)_2HSiO_{0.5}$ units, a 2nd element and a 3rd element of the adhesion promoter, respectively: vinyltrimethoxy-silane (VTMO) and glycidoxypropyltrimethoxysilane (GLYMO), and an inhibitor based on ethynylcyclohexanol.

Once the parts $P_1$ and $P_2$ have been mixed, the stability of this two-component composition under cold conditions in an ambient atmosphere is limited to a few days.

In such a state of the art, one of the essential objectives of the present invention is to provide a self-adhesive adhesive silicone elastomer (ASE) composition which can be crosslinked under hot conditions by polyaddition, which has an effective rheological behavior suitable for industrial rates, in particular as regards adhesive bonding, which is thermally stable, which is convenient to handle and which in particular is provided in the form of a single-component formulation.

Another essential objective of the invention is to provide a single-component self-adhesive ASE composition which is capable of rapidly crosslinking under hot conditions by polyaddition and which is stable at ambient temperature for lengthy periods (e.g. several weeks to several months).

Another essential objective of the present invention is to provide an adhesive silicone elastomer (ASE) composition which is capable of being easily formed and which is capable of retaining the form thus fashioned, at least for the time necessary for the crosslinking.

Another essential objective of the invention is to provide an ASE composition of the type of that defined in the objectives set out above, the rheology of which is such that it makes possible easy deposition on at least one of the two components to be assembled and then the assembling of the two components in predetermined relative positions, while retaining the possibility of handling/moving the assembled components before the ASE adhesive has set (crosslinking), without modifying the predetermined relative positions targeted above.

Another essential objective of the invention is to provide an adhesive silicone elastomer (ASE) composition of polyaddition type, in particular a self-adhesive adhesive silicone elastomer (ASE) composition, which can be obtained in a simple and economical way.

Another essential objective of the present invention is to provide a process for the application of the adhesive silicone elastomer (ASE) composition which can be crosslinked by polyaddition, in particular a self-adhesive adhesive silicone elastomer (ASE) composition, in adhesive bonding, for example of fibrous materials, e.g. of textiles, in particular in motor vehicle trim.

Another essential objective of the present invention is to provide a process for the application of an adhesive silicone elastomer (ASE) composition which can be crosslinked under hot conditions, in particular a self-adhesive adhesive silicone elastomer (ASE) composition, in the manufacture of seals in situ, such as flowed gasket seals, in situ profiled seals and injection-molded or overmolded seals.

Another essential objective of the present invention is to provide a process for the application of an adhesive silicone elastomer (ASE) composition which can be crosslinked by polyaddition under hot conditions, in particular a self-adhesive adhesive silicone elastomer (ASE) composition.

Another essential objective of the present invention is to provide an adhesive comprising the adhesive silicone elastomer (ASE) targeted above and in particular the self-adhesive adhesive silicone elastomer (ASE) targeted above.

These objectives, among others, are achieved by the present invention which relates, firstly, to an adhesive silicone elastomer composition which can be crosslinked under hot conditions by polyaddition (hydrosilylation), this composition being of the type of those comprising:

α/ at least one PolyOrganoSiloxane (POS) carrying ethylenic and/or acetylenic unsaturation(s) {POS comprising ≡Si-[unsaturation] units};

β/ at least one polyorganosiloxane (POS) carrying ≡Si—H units;

γ/ a catalytic combination comprising:
　γ.1 at least one metal catalyst (preferably based on platinum)
　γ.2 and at least one crosslinking inhibitor, δ/ a filler;

ε/ at least one adhesion promoter;

ρ/ at least one POS resin;

λ/ at least one agent for stability toward heat;

φ/ optionally at least one other functional additive;

characterized in that it is a single-component composition and in that the crosslinking inhibitor γ.2 is selected from the group of compounds of following formula (I) or (II):

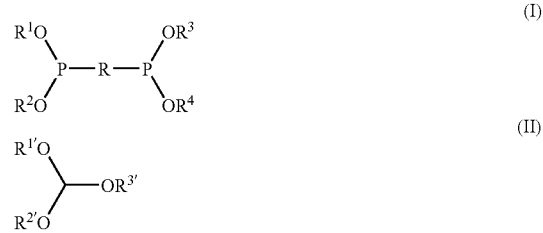

in which:

R, $R^1$, $R^2$, $R^3$, $R^4$, $R^{1'}$, $R^{2'}$ and $R^{3'}$, which are identical or different, represent a linear, branched or cyclic alkyl radical or a substituted or unsubstituted aryl radical, in particular:

i. a linear or branched alkyl radical having in particular from 2 to 30 carbon atoms (C), preferably from 2 to 12 C, ii. an alkyl radical comprising one or more rings, in particular 1 or 2, it being possible for a ring to have in particular from 4 to 14 C, preferably from 5 to 8 C, or iii. an aryl or alkylaryl radical comprising one or more fused or nonfused aromatic rings, in particular 1 or 2 rings, it being possible for a ring to comprise from 4 to 14 C, preferably from 6 to 8 C, optionally substituted by 1 or more, in particular from 1 to 2, linear or branched alkyl(s) having in particular from 1 to 12 C, preferably from 4 to 12 C.

It is to the credit of the inventors to have made this selection of specific inhibitors from the huge family of the phosphines. This inventive method gives access to ASEs of RTV or LSR type which have the great advantage of being single-component formulations which are stable on storage, which have an effective rheological behavior suitable for industrial rates, in particular as regards adhesive bonding, which are convenient to handle and, finally, which are economical.

The ASE compositions according to the invention are able to be used for assembling purposes and/or for providing leak-tightness.

Without this being limiting, it should be pointed out that the crosslinking under hot conditions of the ASE composition according to the invention applies to a temperature, for example, of between 50 and 200° C., preferably between 100 and 150° C., in an ambient atmosphere.

It is naturally a time/temperature compromise which a person skilled in the art can easily determine according to the formulation under consideration.

In the formulae (I) and (II) of the γ.2 inhibitors, R is advantageously a cyclic alkyl radical or an aryl radical, preferably the biphenyl radical.

The R$^1$, R$^2$, R$^3$, R$^4$, R$^{1'}$, R$^{2'}$ and R$^{3'}$ radicals of the formulae (I) and (II) of the γ.2 inhibitor are cyclic alkyls, aryls or alkylaryls, preferably substituted phenyls and more preferably still tert-butylphenyls.

R$^1$, R$^2$, R$^3$, R$^4$, R$^{1'}$, R$^{2'}$ and R$^{3'}$ are advantageously identical.

Preference is given to the compounds comprising aryl radicals or cyclic alkyl radicals for their inhibitory activity, which is longer lasting than that of the compounds comprising linear or branched alkyl radicals.

The preferred inhibitors correspond to the formula (III) or (IV):

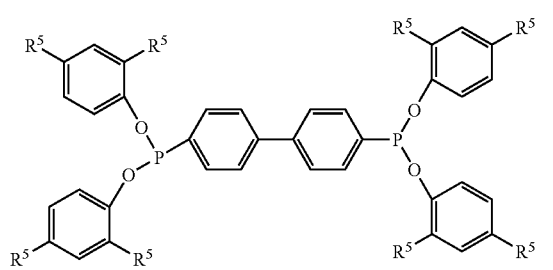

(III)

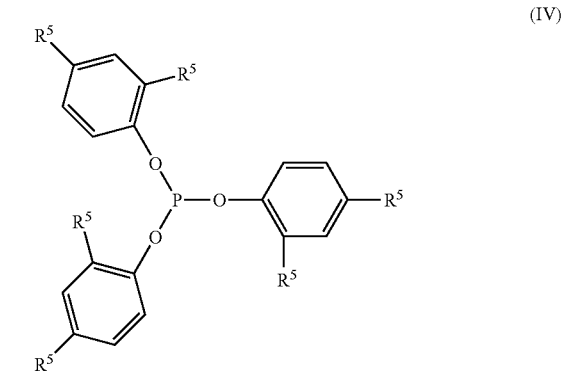

(IV)

in which the R$^5$ radicals, which are identical or different, preferably identical, are linear or branched alkyls having in particular from 1 to 12 C, preferably from 4 to 12 C.

According to an even more preferred embodiment of the invention, the γ.2 inhibitor corresponds to the formula (V) or (VI):

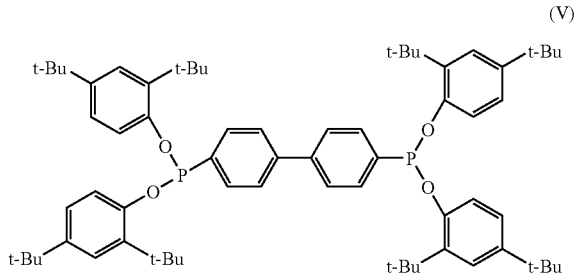

(V)

-continued

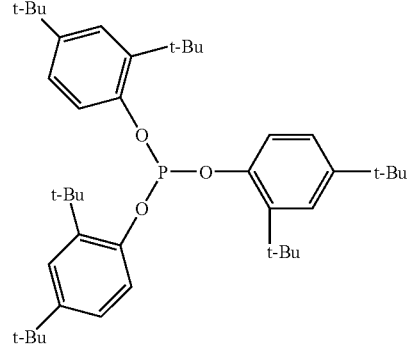

(VI)

The inhibitor of formula (V) is also referenced under the CAS number 38613-77-3.

In other words, the metal of the catalyst to inhibitor molar ratios can be between 1/0.5 and 1/10, preferably between 1/1 and 1/5.

The γ.1 catalysts advantageously used in the γ catalytic combination of the composition according to the invention comprise all the catalysts of use in the hydrosilylation of POSs carrying ≡Si—H units and of POSs carrying ≡Si-[ethylenic or acetylenic unsaturation] units. They can thus be platinum, rhodium, iridium, nickel, ruthenium and/or palladium compounds. They are more particularly iridium compounds or better still platinum compounds.

The platinum compound can be any complex of platinum and of an organic product, e.g. those disclosed in patents U.S. Pat. Nos. 3,159,601, 3,159,602, 3,220,972 and European patents EP-A-0 057 459, EP-A-0 188 978 and EP-A-0 190 530, or any complex of platinum and of vinyl-comprising organosiloxanes, e.g. those disclosed in patents U.S. Pat. Nos. 3,419,593, 3,715,334, 3,377,432 and 3,814,730.

Mention may be made of chloroplatinic acid, a chloroplatinic acid modified by an alcohol, or a complex of chloroplatinic acid with an olefin, an aldehyde or a vinylsiloxane, inter alia. Patent U.S. Pat. No. 2,823,218 discloses a hydrosilylation catalyst of the chloroplatinic acid type and patent U.S. Pat. No. 3,419,593 relates to catalysts formed by complexes of chloroplatinic acid and of organosilicone of the vinylsiloxane type. Complexes of platinum and of hydrocarbons of use as hydrosilylation catalyst are disclosed by patents U.S. Pat. Nos. 3,159,601 and 3,159,602. Patent U.S. Pat. No. 3,723,497 discloses a platinum acetylacetonate and patent U.S. Pat. No. 3,220,972 has as subject matter catalysts based on platinum alkoxide.

The γ.1 catalysts more especially selected in accordance with the invention are platinum/unsaturated siloxane complexes, in particular platinum/vinyl-siloxane complexes, especially those obtained by reaction between a platinum halide and an unsaturated organosilicon material, such as an unsaturated silane or an unsaturated siloxane, e.g. according to the teaching of U.S. Pat. No. 3,775,452, to which a person skilled in the art may refer. The invention preferably applies to the Karstedt solution or complex described above.

As regards the γ.1/γ.2 proportions and in accordance with a preferred method of the invention, the phosphorus of γ.2/platinum of γ.1 ratio by weight is such that:

P/Pt ≧ 1, preferably, 5 ≧ P/Pt ≧ 1, and, more preferably still, 4 ≧ P/Pt ≧ 1.

The γ catalytic assembly selected comprises a mixture of the γ.1 catalyst and of the γ.2 inhibitor, this mixture resulting in a novel complex entity between these two compounds. Without wishing to be committed to a theory, it is believed that, starting from the Karstedt complex and from an inhibitor of formula (I), the novel entity (I') exhibits a structure of the type:

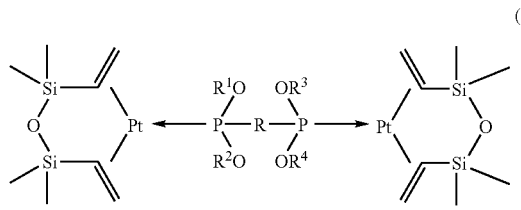

(I')

$R, R^1, R^2, R^3$ and $R^4$ having the meanings given with regard to the formula (I).

With the inhibitors of formulae (III) and (V), without wishing to be committed to a theory, it is believed that the novel entities (III'). and (V') respectively have the following structures:

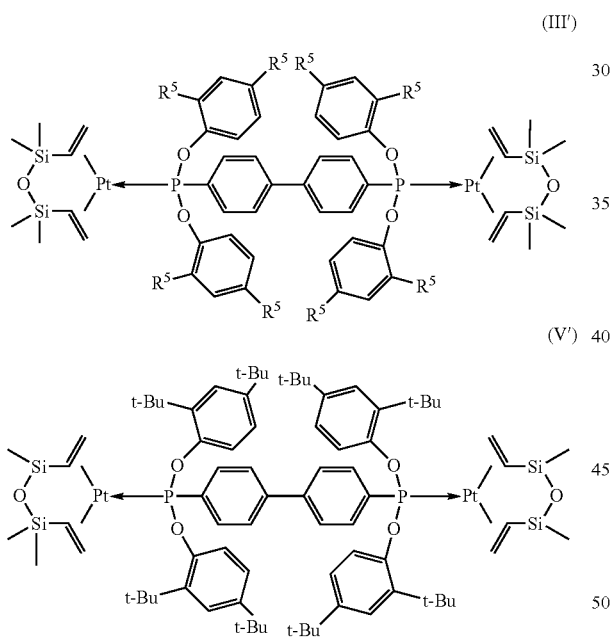

In the formulae (I'), (III') and (V'), the arrows represent the interactions between the orbitals of the P and Pt atoms.

Very advantageously, the inhibitors employed in the composition according to the invention, e.g. the γ.2 inhibitors of formula (III), are soluble in unsaturated silanes or siloxanes (e.g. vinylsiloxanes) and in platinum/unsaturated siloxane solutions, e.g. platinum/vinylsiloxane solutions. These vinylsiloxanes can, for example, be hexamethyldisiloxane ($M_2$) or octamethyl-cyclotetraorganosiloxane ($D_4$). This makes processing easier during mixing with silicone oils.

For the preparation of such a catalytic solution, the γ.1 catalyst solution and the γ.2 inhibitor=(III) are mixed until the inhibitor has completely dissolved. Preferably, the inhibitor is added to the catalyst solution.

Another advantageous way of introducing this inhibitor into the ASE formulation is to prepare an additive. This additive is composed of a vinyl-comprising silicone oil with a viscosity of less than 100 000 mPa·s to which at least one inhibitor of formula (III) or (IV) is added. This mixture is then stirred and heated to a melting point greater than that of the inhibitors (for example approximately 100° C. for the γ.2 inhibitor=(III)), which makes it possible to obtain a dispersion of these inhibitors in a silicone oil. Finally, when the mixture is cold, the γ.1 catalyst based on Pt is added, which results in an additive formed by a Pt/inhibitor complex.

According to a specific method of the invention, an inhibitor of formula (I) to (IV), in particular in solution in a vinylsiloxane, or another crosslinking inhibitor, for example an acetylenic alcohol (FR-A-2 372 874, FR-A-1 528 464), a compound of maleate type (U.S. Pat. Nos. 4,256,870 and 4,530,989) or a compound of acetylenedicarboxylate type (U.S. Pat. Nos. 4,504,645 and 4,347,346), can be added to the composition comprising the α and β POSs and the catalytic combination according to the invention.

The γ catalytic combination according to the invention can be simply mixed with the α POS or with the β POS or with a mixture of the α and β POSs, before or after addition of the other ingredients.

In addition to this carefully selected catalytic combination, the composition according to the invention also comprises α and β POSs which can advantageously be chosen from the following entities:

the α POS or POSs comprise siloxyl units

(VII)

and siloxyl units of formula:

(VIII)

the β POS or POSs comprise siloxyl units

(IX)

and siloxyl units of formula:

(X)

in which formulae the various symbols have the following meaning:

⇒the $R^6$ symbols, which are identical or different, each represent a nonhydrolyzable group of hydrocarbon nature, it being possible for this radical to be:
  an alkyl radical having from 1 to 5 carbon atoms which can comprise from 1 to 6 chlorine atoms,
  cycloalkyl radicals having from 3 to 8 carbon atoms which can comprise from 1 to 4 chlorine atoms,
  aryl or alkylaryl radicals having from 6 to 8 carbon atoms which can comprise from 1 to 4 chlorine atoms,
  cyanoalkyl radicals having from 3 to 4 carbon atoms; methyl, ethyl, propyl, isopropyl, butyl, isobutyl, n-pentyl, t-butyl, chloromethyl, dichloromethyl, α-chloroethyl, α,β-dichloroethyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl, and xylyl, such as 2,3-dimethylphenyl or 3,4-dimethylphenyl, groups being preferred; methyl and phenyl radicals being particularly preferred;

⇒the Z symbols represent a $C_2$-$C_6$ alkenyl group (preferably a vinyl group);

⇒n=an integer equal to 0, 1, 2 or 3;

⇒x=an integer equal to 0, 1, 2 or 3;

⇒y=an integer equal to 0, 1 or 2;

⇒the sum x+y lies within the range from 1 to 3,
⇒w=an integer equal to 0, 1, 2 or 3.

The nature of the polyorganosiloxane and thus the ratios of the siloxyl units (VII) to the siloxyl units (VIII) and the distribution of the latter are, as is known, chosen according to the crosslinking treatment which will be carried out on the curable composition for the purpose of converting it to an elastomer.

Mention may be made, as examples of siloxyl units of formula (VIII) constituting the POS, of: vinyldimethylsiloxyl, vinylphenylmethylsiloxyl, vinylmethylsiloxyl and vinylsiloxyl.

The dimethylsiloxyl, methylphenylsiloxyl, diphenylsiloxyl, methylsiloxyl and phenylsiloxyl units are examples of siloxyl units of formula (VII) of the POS.

POS examples are linear and cyclic compounds, such as:
dimethylpolysiloxanes comprising dimethylvinylsilyl ends,
(methylvinyl)(dimethyl)polysiloxane copolymers comprising trimethylsilyl ends,
(methylvinyl)(dimethyl)polysiloxane copolymers comprising dimethylvinylsilyl ends,
or cyclic methylvinylpolysiloxanes.

The polyorganosiloxane compositions according to the invention are single-component compositions and are stable for a very long time under cold conditions. They crosslink only with heat (50-200° C., preferably 100-150° C.) by polyaddition reactions, essentially by reaction of hydrosilyl groups with alkenylsilyl groups.

The polyorganosiloxanes participating in these compositions are generally composed of base pairs, on the one hand, of a linear, branched or crosslinked polysiloxane composed of (VIII) units in which the Z residue represents a $C_2$-$C_6$ alkenyl group (preferably a vinyl group) and where x is at least equal to 1, optionally in combination with (VII) units, and, on the other hand, of a linear, branched or crosslinked ≡SiH POS hydropolysiloxane composed of (VIII) units in which the Z residue then represents a hydrogen atom and where x is at least equal to 1, optionally in combination with (VII) units.

As regards the β polyorganohydrosiloxane, it is advantageously chosen from linear, cyclic or network homopolymers and copolymers exhibiting on average, per molecule, preferably at least 3 hydrogen atoms bonded to different silicon atoms and the organic radicals of which, bonded to the silicon atoms, are chosen from methyl or ethyl radicals, at least 60 mol % of these radicals (and preferably all of these radicals) being methyl radicals.

According to an advantageous arrangement, the POS (β) is used in an amount such that the molar ratio of the hydride functional groups of the POS (β) to the vinyl groups of the POS (α) is between 1.1 and 4.

Examples of siloxyl units composing the POS (β) are $H(CH_3)_2SiO_{1/2}$ or $H(CH_3) SiO_{2/2}$ or $H(C_6H_5)SiO_{2/2}$.

Mention may be made, as examples of POS (β), of:
dimethylpolysiloxanes comprising hydrodimethylsilyl ends,
copolymers comprising (dimethyl) (hydromethyl)polysiloxane units comprising trimethylsilyl ends,
copolymers comprising (dimethyl) (hydromethyl)polysiloxane units comprising hydrodimethylsilyl ends,
(hydromethyl)polysiloxanes comprising trimethylsilyl ends,
cyclic (hydromethyl)polysiloxanes.

These α and β POSs are, for example, respectively a polyorganovinylsiloxane and a polyorganohydrosiloxane. The organic substituents other than the vinyl and hydrogen reactive groups are, for example, methyls or cyclohexyls. The hydrogens and the vinyls are carried by siloxyl units M=[R_3SiO—] and/or D=[—R_2SiO—] and/or T=[—RSiO—].

These hydrogen-comprising or vinyl-comprising units M or D each respectively comprise one or more H or vinyl groups, preferably just one.

The number of ≡SiH or ≡SiVi units per molecule is preferably greater than or equal to 2. This can in particular represent from 0.01% to 10% (preferably 0.1 to 2%) of vinyl by weight for the α POS and from 0.001% to 5% (preferably 0.05 to 2%) of hydrogen by weight for the β POS.

Appropriate β POSs are:
polymethylhydrosiloxanes comprising —Si(CH_3)_3 ends,
polydimethylsiloxanes comprising —Si(CH_3)_2H ends,
methylhydrodimethylsiloxane copolymers comprising —Si(CH_3)_2H ends,
methylhydromethyloctylsiloxane copolymers,
and methylhydrocyclosiloxane polymers.

In general, the α and β POSs have an average molecular mass of between $1 \times 10^2$ and $1 \times 10^7$ (g/mol).

The compositions according to the invention can be of RTV or LSR type. By way of indication, crosslinkable RTV silicone elastomer compositions have a viscosity $\eta_{RTV}$ at 25° C. such that $\eta_{RTV} \leq 100\,000$ mPa·s and cross-linkable LSR silicone elastomer compositions have a viscosity $\eta_{LSR}$ such that $$100\,000 \leq \eta_{LSR} \leq 2\,000\,000 \text{ mPa·s}$$

As regards the polyaddition POSs employed in the compositions according to the invention (α POS—indeed even ρ POS), several classes thereof are distinguished which differ in their viscosity and which define polyaddition silicone elastomer compositions of RTV or LSR type.

In the case of RTV compositions which crosslink by polyaddition reactions, the α and/or β POS polyorganosiloxane constituent(s) are chosen from those carrying alkenylsilyl groups which advantageously exhibit a viscosity η at 25° C.:

$$200 \leq \eta \leq 200\,000 \text{ mPa·s}$$

preferably, $500 \leq \eta \leq 100\,000$ mPa·s

In the case of LSR compositions which crosslink by polyaddition reactions, the α and/or ρ POS(s) carrying alkenylsilyl groups have, for example, a viscosity η' at 25° C.:

$$10\,000 \leq \eta' \leq 500\,000 \text{ mPa·s}$$

In the case of the RTV or LSR polyorganosiloxane compositions, the β polyorganosiloxane constituent(s) carrying hydrosilyl groups generally has (have) a viscosity at 25° C. at most equal to 10 000 mPa·s and preferably of between 5 and 1000 mPa·s.

All the viscosities with which the present account is concerned correspond to a dynamic viscosity quantity at 25° C. measured, in a way known per se, at a shear rate gradient representative of its use.

According to one alternative form, it is possible to envisage the composition according to the invention comprising mixtures of POSs which differ in their nature and/or in their viscosity.

More specifically, the composition according to the invention comprises:
α/—at least one POS exhibiting, per molecule, at least two $C_2$-$C_6$ alkenyl groups bonded to silicon;
β/—at least one POS exhibiting, per molecule, at least two hydrogen atoms bonded to silicon;
γ/—a catalytic combination as defined above;

ε/ an adhesion promoter, preferably a binary adhesion promoter and more preferably still an adhesion promoter consisting of:
  ε.1 at least one alkoxylated organosilane comprising, per molecule, at least one $C_2$-$C_6$ alkenyl group,
  ε.2 at least one organosilicon compound comprising at least one epoxy radical;
δ/
  δ.1 a reinforcing filler,
  δ.2 a nonreinforcing (semireinforcing) or bulking filler,
  δ.3 or a microsphere filler;
ρ/ optionally at least one POS resin carrying T and/or Q, optionally M and/or D, siloxyl units and alkenyl-comprising siloxyl units, preferably vinyl-comprising siloxyl units of $M^{Vi}$ and/or $D^{Vi}$ type, resins of $MM^{Vi}D$-$D^{Vi}Q$ type being very particularly preferred;
λ/ optionally at least one additive for stability toward heat;
φ/ optionally at least one other functional additive.

The reinforcing filler δ.1 can be chosen from inorganic materials, in particular siliceous materials.

Reinforcing siliceous fillers are chosen from colloidal silicas, fumed silica powders, precipitated silica powders or their mixtures. These powders exhibit a mean particle size generally of less than 0.1 μm and a BET specific surface of greater than 50 $m^2$/g, preferably of between 50 and 400 $m^2$/g, in particular between 90 and 350 $m^2$/g.

The nonreinforcing or semireinforcing (bulking) filler δ.2 is advantageously employed in addition to the reinforcing filler δ.1. This filler δ.2 can itself also be selected from the group of inorganic materials consisting, inter alia, of semireinforcing siliceous fillers, such as diatomaceous earths or ground quartz.

δ.2 can also be a nonsiliceous inorganic material. Examples of nonsiliceous fillers which can be used, alone or as a mixture, are carbon black, titanium dioxide, magnesium oxide, aluminum oxide, aluminum hydrate, expanded vermiculite, unexpanded vermiculite, calcium carbonate, zinc oxide, mica, talc, iron oxide, barium sulfate, slaked lime, diatomaceous earths, ground quartz and ground zirconia.

These nonsiliceous fillers have a particle size generally of between 0.001 and 300 μm and a BET specific surface of less than 100 $m^2$/g.

In practice but without limitation, the fillers employed can be a mixture of quartz and of silica.

The fillers can be pretreated with any appropriate product, e.g. with chlorosilanes, cyclosiloxanes or hexamethyldisilazane (HMDZ), or other organosilicon compounds commonly employed for this use, such as organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505 and British patent GB-A-1 024 234).

Thus, the reinforcing siliceous filler δ.1 can, for example, be treated in situ with a "compatibilizing" agent, preferably of HMDZ type, in the presence of the POS (α).

The term "in situ treatment of the siliceous filler" is understood to mean that the filler and the compatibilizing agent are brought together with at least a portion of polyorganosiloxane (α) silicone oil. In a particularly preferred way, this consists essentially in introducing compatibilization agent (CA) into the preparation medium in two steps:
  on the one hand, before and/or substantially simultaneously with the operation in which at least a portion of silicone oil employed and at least a portion of the siliceous filler used are brought together, this introduction of CA (portion 1) being carried out on one or more occasions and corresponding to a proportion of less than or equal to 8%, preferably of less than or equal to 5% and more preferably still of less than or equal to 3%, by dry weight with respect to the total filler;
  and, on the other hand (portion 2), after this operation in which silicone oil and filler are brought together.

The compatibilizing agent of portion 1 is thus chosen from molecules which satisfy at least two criteria:
  exhibit a strong interaction with the silica (hydrogen bonds) and with the surrounding silicone oil;
  can be, themselves or their decomposition products, easily removed from the final mixture by heating under vacuum or under a gas stream.

Compounds of low molecular weight are thus preferred.

The agent of portion 1 can, for example, be:
  a silazane, preferably a disilazane, or their mixtures, hexamethyldisilazane (HMDZ) being preferred and being able to be used in combination with divinyltetramethyldisilazane,
  a di- or preferably monofunctional hydroxylated siloxane,
  an amine, such as ammonia or an alkylamine of low molecular weight, such as diethylamine,
  an organic acid of low molecular weight, such as formic acid or acetic acid.

This agent of portion 1 is preferably employed in the presence of water.

The compatibilizing agents of portion 2 can be chosen from the various silazanes and disilazanes encountered above, taken alone or as mixtures with one another, preferably from disilazanes, hexamethyldisilazane in combination or not with divinyltetramethyldisilazane being particularly preferred.

This in situ treatment of silica with HMDZ is described in detail in patent application WO-A-98/58997, which is incorporated in its entirety in the present account by reference. In the case where such treatment results in a basic pH, it is possible to add a neutralizing agent (H), such as, for example, a weak acid (acetic acid or phosphoric acid, e.g.) or a silica filler, such as ground quartz, to the dispersion.

The filler δ.3 can also be a microsphere filler, that is to say a filler preferably composed of expandable organic microspheres comprising, as is known per se, a polymer wall including a liquid or a gas. The expansion of these microspheres is brought about by heating them beyond the softening point of the polymer and at a temperature sufficient to vaporize the liquid or suitably expand the gas, which can, for example, be an alkane, such as isobutane or isopentane. The wall can consist, as is known per se, of polymers or copolymers, for example prepared from vinyl chloride, vinylidene chloride, acrylonitrile, methyl methacrylate or styrene monomers, or blends of polymers and/or copolymers, for example in particular acrylonitrile/methacrylonitrile copolymers or acrylonitrile/vinylidene chloride copolymer. See in particular U.S. Pat. No. 3,615,972.

They can be incorporated in the composition without distinction in the expanded state or before their expansion, which expansion can be brought about by appropriate heating during the crosslinking of the composition.

Before their expansion, the microspheres will preferably have a diameter of between 3 and 50 μm, more particularly between 5 and 30 μm.

The aim will also be to find a diameter after expansion (in situ or to begin with) of in particular between 10 and 150 μm, especially between 20 and 100 μm.

These fillers can be present in a proportion:
  of 5 to 30%, preferably of 15 to 25%, with respect to the total composition without the microspheres, for the reinforcing fillers δ.1, of 5 to 40%, preferably of 10 to 30%, preferably of 2 to 10% and more preferably of more than 3 or 4%, by weight with respect to the total composition, for the semireinforcing or bulking fillers δ.2, of 1 to 30% by weight, preferably of 2 to 10% and more preferably of more than 3 or 4%, by weight with respect to the total composition, for the microsphere filler δ.3.

More generally, quantitatively, the compositions according to the invention reflect standard proportions in the technical field under consideration, it being known that the application targeted also has to be taken into account.

The resin ρ carries alkenyl-comprising siloxyl units, preferably vinyl-comprising siloxyl units of $M^{Vi}$ and $D^{Vi}$ type. The organic substituents of the MDT and/or Q siloxyl units of these resins are, for example, methyl, isopropyl, tert-butyl, n-hexyl or phenyl radicals.

These silicone resins are well known branched POSs, the processes for the preparation of which are disclosed in a great many patents.

Mention may be made, of examples of resins which can be used, of the MQ, MDQ, TD and MDT resins. More specifically, it can in practice be a resin of $MM^{Vi}DD^{Vi}Q$ type. These resins ρ can be solid or liquid at ambient temperature. They can be in solution in an organic solvent or a silicone oil.

The adhesion promoter ε preferably comprises:
ε.1 at least one alkoxylated organosilane comprising, per molecule, at least one $C_2$-$C_6$ alkenyl group,
ε.2 at least one organosilicon compound comprising at least one epoxy radical.

The alkoxylated organosilane ε.1 of the promoter ε is more particularly selected from the products of following general formula:

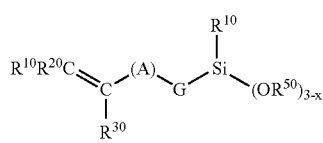
(ε.1)

in which
$R^{10}$, $R^{20}$ and $R^{30}$ are hydrogen or hydrocarbon radicals which are identical to or different from one another and preferably represent hydrogen, a linear or branched $C_1$-$C_4$ alkyl or a phenyl optionally substituted by at least one $C_1$-$C_3$ alkyl,
A is a linear or branched $C_1$-$C_4$ alkylene,
G is a valency bond or oxygen,
$R^{40}$ and $R^{50}$ are identical or different radicals and represent a linear or branched $C_1$-$C_4$ alkyl,
x'=0 or 1,
x=0 to 2, preferably 0 or 1 and more preferably still 0.

Without this being limiting, it may be considered that vinyltrimethoxysilane (VTMS) is a particularly appropriate compound ε.1.

As regards the organosilicon compound ε.2, provision is made, in accordance with the invention, to choose it:

either from the products ε.2a corresponding to the following general formula:

(ε.2a)

in which:
$R^{60}$ is a linear or branched $C_1$-$C_4$ alkyl radical,
$R^{70}$ is a linear or branched alkyl radical,
y is equal to 0, 1, 2 or 3, preferably to 0 or 1 and more preferably still to 0,

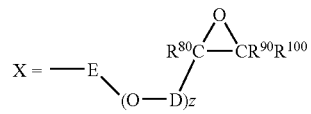

with:
E and D being identical or different radicals chosen from linear or branched $C_1$-$C_4$ alkylenes,
z being equal to 0 or 1,
$R^{80}$, $R^{90}$ and $R^{100}$ being identical or different radicals representing hydrogen or a linear or branched $C_1$-$C_4$ alkyl, hydrogen being more particularly preferred,
it being possible for $R^{80}$ and $R^{90}$ or $R^{100}$ alternatively to constitute, together with the two carbons carrying the epoxy, an alkyl ring having from 5 to 7 ring members,
or from the products ε.2b composed of epoxy-functional polydiorganosiloxanes comprising at least one unit of formula:

$$X_pG_qSiO \qquad (\varepsilon.2b1)$$

in which:
X is the radical as defined above for the formula (ε.2a),
G is a monovalent hydrocarbon group which has no unfavorable effect on the activity of the catalyst and which is preferably chosen from alkyl groups having from 1 to 8 carbon atoms inclusive optionally substituted by at least one halogen atom, advantageously from the methyl, ethyl, propyl and 3,3,3-trifluoropropyl groups, and as well from aryl groups, advantageously from the xylyl, tolyl and phenyl radicals,
p=1 or 2,
q=0, 1 or 2,
p+q=1, 2 or 3, optionally at least a portion of the other units of these polydiorganosiloxanes being units of mean formula:

$$G_rSiO \qquad (\varepsilon.2b2)$$

in which G has the same meaning as above and r has a value of between 0 and 3, for example between 1 and 3.

The compounds ε.2 are thus preferably epoxyalkoxysilicon compounds and more preferably still epoxyalkoxymonosilanes ε.2a.

Mention may be made, as examples of such compounds ε.2, of:
3-glycidoxypropyltrimethoxysilane (GLYMO),
or 3,4-epoxycyclohexylethyltrimethoxysilane.

According to the invention, an advantageous combination in forming the adhesion promoter is as follows:

VTMS/GLYMO

Quantitatively, it may be specified that the proportions by weight of ε.1 to ε.2, expressed as percentages by weight with respect to the total of the two, are as follows:

ε.1≧10, preferably between 15 and 70 and more preferably still 25 to 65,

ε.2≦90, preferably between 70 and 15 and more preferably still 65 to 25, it being understood that the sum of these proportions of ε.1 and ε.2 is equal to 100%.

It should be noted that, in the case where the composition comprises an extender φ, then the alkoxylated organosiloxane ε.1 preferably comprises at least one $C_3$-$C_6$ alkenyl group.

The optional agent λ for stability toward heat (in the crosslinked state) can, for example, be chosen from the group consisting of: $TiO_2$ (particles, preferably with a predominantly anatase or predominantly rutile polycrystalline structure, optionally surface treated and disclosed in particular in French patent application FR 98/03396 [R98041]), iron or cerium oxides, metal organic acid salts, e.g. iron or cerium organic acid salts, for example iron or cerium octoate, and carbon black.

The silicone compositions of the invention can additionally comprise conventional functional additives φ. Mention may be made, as families of conventional functional additives φ, of:

extenders composed of at least one α,ω ≡SiH POS,
hydroxylated POS oils of use as compatibilizing agent,
neutralizing agents,
colorants,
adhesion modifiers,
additives for stability toward heat,
additives for enhancing the consistency,
additives for stability toward heat, oils or fire (for example, metal oxides).

The optional extending POS φ can be a POS exhibiting end siloxyl units of type: $HR^0{}_2SiO_{1/2}$, with $R^0$ identical to or different from one another and corresponding to a linear or branched $C_1$-$C_6$ alkyl group and/or a substituted or unsubstituted aryl, $R^0$ preferably being $CH_3$.

In addition to these end units, this POS φ is furthermore a polydiorganosiloxane, preferably a polydimethylsiloxane.

Mention may be made, as examples of POS φ, of α,ω-(dimethylhydrosiloxy)poly(dimethylsiloxy)siloxane. In practice, this α,ω-hydrogenated PDMS can be a commercial product, such as Rhodorsil® 620 H2 from Rhodia Chimie.

As regards the preparation of the composition, it is advantageously carried out as follows:

(i) the catalytic combination γ is-obtained:
either by mixing the inhibitor γ.2 with a solution/dispersion of catalyst γ.1, preferably in an optionally vinyl-comprising polysiloxane oil,
or by mixing the catalyst γ.1 in a dispersion of the inhibitor γ.2 in a silicone oil, preferably a vinyl-comprising silicone oil, with a viscosity of less than or equal to 100 000 mPa·s at 25° C.;

(ii) then, subsequently:
a) first of all a portion of the constituents, with the exception of the catalytic combination γ, is mixed;
b) heating is carried out, preferably under vacuum;
c) cooling is carried out;
d) and then the remainder of the constituents, except for the catalytic combination γ, is added with stirring to the premix thus obtained and, finally, the catalytic combination γ is added.

The constituents employed are preferably:
in stage a): α, δ and ρ,
in stage d): ε, β, λ and γ.

The present invention also encompasses a whole chapter of applications of the adhesive silicone elastomer ASE composition as defined above which can be crosslinked by polyaddition and to which a platinum/phosphine inhibitor (I) or (II) catalytic combination has been added.

The compositions in accordance with the invention can be employed in multiple applications, such as the assembling of the most diverse materials (metals, plastics, glass and ceramic) or the formation of seals in various industrial fields: motor vehicles and transportation, domestic electrical appliances, electrical engineering, and the like.

With regard to the formation of seals, the compositions are more especially suitable for the formation of "in situ" seals used in industry. These "in situ" seals encompass several types, namely "flowed gasket" seals, also referred to as flattened seals, profiled seals (PS), also known as shaped seals, and finally injection-molded (or overmolded) seals.

The "flowed gasket" seals relate, in the motor vehicle industry, to assemblages which do not have to be ordinarily dismantled, such as, for example, the leak-tightnesses of engines (cylinder block, front plate cylinder head) and transmissions. In the field of domestic electrical appliances, mention may be made of the assembling of baking trays, the assembling of glass-ceramic cooktops and the assembling of ironing irons.

The "profiled" seals (PS) are used in the area of transportation and of the motor vehicle industry for leaktightness applications with regard to all engine components requiring the ability to be dismantled; such as, by way of examples, the cylinder-head cover, oil pump, water pump, radiator tank, oil sump, timing case or clutch guide.

The materials constituting these components and to which the ASEs according to the invention adhere perfectly can be glass, stainless steel, cast iron, aluminum, galvanized sheet, electrogalvanized sheet, sheet painted with cataphoresis paint, polyamide, phenoplast resins, and the like.

In the field of domestic electrical appliances, various applications of the ASEs according to the invention may be mentioned:
doors for electric or gas ovens,
doors for microwave or mixed ovens,
glass-ceramic cooktops,
components of ironing irons,
washing machine drums.

The applications of the ASEs according to the invention which can be envisaged in the electrical engineering and electronics industries are:
covers for electrical or electronic housings,
electronic cards.

As regards the assembling, and apart from the assembling of components with a flowed gasket seal as described above, mention may be made of surface adhesive bonding applications, such as the adhesive bonding of fabrics, for example to seats (motor vehicle trim) (transportation sector). The ASEs according to the invention are particularly suitable for this application due to their good ranking with regard to fire-smoke safety regulations, due to their good level of thixotropy, which prevents impregnation of the product before crosslinking followed by "staining" of the fabric, and, finally, due to their good level of adhesion to the base materials constituting the supports (steel, including stainless steel, polyester, ABS, polycarbonate, velvet, and the like).

The single-component ASE according to the invention also makes it possible to carry out the adhesive bonding of various buoyancy components made of glass, stainless steel and polyamide.

Thus, the ASE composition according to the invention can be used as adhesive for the assembling of at least two elements. Such a process of application is characterized in that it consists essentially in coating at least one of the elements to be assembled with a layer of composition according to the invention, in assembling said elements by applying them against one another and in crosslinking the elastomeric adhesive, preferably by heating.

According to an advantageous arrangement of the invention, the elements to be assembled are two in number.

More preferably still, one of the elements to be assembled is a woven, knitted or nonwoven fibrous material based on conventional natural and/or synthetic fibers.

An application in the adhesive bonding of fibrous materials, e.g. textile materials, in particular in the context of the motor vehicle trim sector, may be concerned, for example.

It thus appears that the fields of application of the single-component ASE for polyaddition which can be crosslinked under hot conditions according to the invention are adhesive bondings, assembling operations and the formation of leak-tight seals, in an efficient and safe manner, in the domestic electrical appliance and motor vehicle sectors, inter alia.

Finally, the present invention relates to an adhesive, characterized in that it comprises the single-component ASE composition according to the invention.

In addition to these assembling and seal-forming applications of these ASEs according to the invention [platinum/phosphorus (I) and (II)], mention may also be made of their uses in molding.

The present invention will be better understood in the light of the examples which follow.

EXAMPLES

Example 1

A/ ASE Formulation

POS α.1: PolyDiMethylSiloxane PDMS blocked with $(CH_3)_2ViSiO_{0.5}$ units having a viscosity of approximately 100 Pa·s and comprising approximately 0.0022 SiVi functional group per 100 g of oil;

POS β: poly(dimethyl) (hydromethyl)siloxane blocked with $(CH_3)_2HSiO_{0.5}$ units having a viscosity of approximately 25 mPa·s and comprising in total approximately 0.7 SiH functional group per 100 g of oil;

catalytic combination γ:

γ.1 platinum metal in the form of a metal complex, known under the name of Karstedt catalyst, in solution in a vinyl-comprising PDMS oil;

γ.2 Irgafos® P-EPQ of formula:

resin ρ: resin with the structure $MM^{Vi}DD^{Vi}Q$ comprising, by weight, approximately 0.6% of vinyl groups (Vi) and composed, by weight, of approximately 17% of $(CH_3)_3SiO_{0.5}$ units (M units), 0.5% of $(CH_3)_2ViSiO_{0.5}$ units ($M^{Vi}$ units), 75% of $(CH_3)_2SiO$ units (D units) and 8% of $SiO_2$ units (Q units);

filler δ.1: 200 m²/g fumed silica treated with octamethylcyclotetrasiloxane;

filler δ.2: diatomaceous earth with a specific surface of approximately 5 m²/g and characterized by its pH in the region of 8 (Celite® 350);

promoter ε.1: vinyltrimethoxysilane (VTMO);

promoter ε.2: glycidoxypropyltrimethoxysilane (GLYMO);

colorant γ: carbon black, Graphtol Black BLN, as a 15% dispersion in PDMS oil with a viscosity of 1000 mPa·s.

B/ Preparation of the ASE Formulation

1. Premix

First of all a suspension referred to as premix is prepared by mixing, at ambient temperature in a reactor with a capacity of approximately 2 liters equipped with a central stirrer of the "butterfly wing" (planetary mixer) type, the following ingredients:

Silicone resin ρ

POS α.1

Silica δ.1 and Celite® 350 δ.2.

The combined mixture is homogenized for approximately 50 min at a rotational speed of the stirrer of 200 T; the temperature then reaches approximately 80° C.

The apparatus is then placed under a vacuum of approximately 25 mmHg and the stirring speed is increased to 500 T for 5 min; in this phase, the temperature reaches approximately 125° C.

The apparatus is brought back to atmospheric pressure and is allowed to cool.

The combined product is homogenized at approximately 350 T for a further 5 to 10 min.

The premix or paste, which is used for the formulation of the single-component ASE, is then collected.

2. Preparation of a Catalytic Solution γ Having a P/Pt Ratio of 1.5

10 g of a Karstedt platinum solution γ.1 comprising 12.6% by weight of Pt (6.46 mmol of platinum) are placed in a flask equipped with a magnetic stirrer.

5.01 g (4.85 mmol, i.e. 0.75 equivalent) of the inhibitor γ.2 defined above are added to the preceding solution with stirring.

At the end of the addition, the reaction mixture is kept stirred for a few minutes. An orangey-yellow catalytic solution is obtained comprising 8.4% by weight of platinum. This clear homogeneous solution which can be easily handled is used in the following examples.

The NMR analysis of this reaction mixture shows the complete disappearance of the Karstedt catalyst.

3. ASE Formulation

The following are brought together with stirring in the same mixer as above:
the premix or paste obtained in 1 above,
promoter ε.1,
promoter ε.2,
POS β,
colorant λ, and, finally, the catalytic combination δ is added at ambient temperature.

The formulation produced is given in table 1.

TABLE 1

| Reactants (%) | ASE Formulation |
| --- | --- |
| Silicone resin ρ | 20 |
| Vinyl-comprising POS oil α.1 | 42.83 |
| Filler δ.2: Celite 350 | 31.5 |
| Filler δ.1: 200 m²/g fumed silica treated with octamethylcyclotetrasiloxane | 2 |
| Promoter ε.1: VTMO silane | 0.9 |
| Promoter ε.2: GLYMO silane | 0.9 |
| POS β: ≡Si—H oil | 1.86 |
| Catalytic combination γ (Pt ppm) | 20 |
| Agent for stability toward heat λ (colorant) | 0.5 |

The combined product is provided in the form of a consistent thixotropic elastomer which is black in color.

C/ Evaluations

1/ Rheological Behavior 1-1/ Properties Measured with a Carri-Med Rheometer

The single-component ASE formulation exhibits a newtonian behavior with a fall in the viscosity as a function of the shear gradient. The data representative of the viscosity, the flowability and the extrusion appear in table 2. The conditions of the rheometer (Carri-Med) used to determine the viscosity are presented in table 3.

TABLE 2

| | Typical values |
| --- | --- |
| Viscosity - Carri-Med (Pa · s) | 150 to 200 |
| Yield point - Carri-Med (N/m²) | 25 to 30 |
| Flowability - Boeing S7502 (mm) | 5 to 10 |
| Extrusion - 3 mm/3 bar (g/min) | 10 to 15 |

TABLE 3

| | Rheometer conditions | |
| --- | --- | --- |
| Cone | Diameter: 2 cm | |
| | Angle: 1 degree | |
| | Gap: 28 microns | |
| | Inertia: 1.07 | |
| Measurement procedure | Waiting time: 1 minute | |
| | Initial stress: 0 N/m² | |
| | Final stress: 2500 N/m² | |
| | Variation in stress: linear | |
| | Rise time: 2 minutes | |
| | Fall time: 2 minutes | |
| Shear gradient | 25 s$^{-1}$ | |

1-2/ Implementation

A qualitative adhesive bonding, consisting in adhesively bonding an internal window to an inner door made of painted metal, allowed the following observations to be made:
- The window is completely adhesively bonded after 15 minutes at 150° C.
- The creep of the RTV composition appears acceptable, according to the properties in table 2.
- Pulling off the window manually gives rise to facies with 100% cohesive failure.

The single-component ASE formulation behaves correctly when it is used on base materials identical to those used by our clients.

2/ Crosslinking Kinetics

In order to precisely evaluate the crosslinking kinetics of the formulation, mixed adhesive bondings (standard MNRPS 748—seal with a thickness of 1 mm) were carried out between glass/stainless steel at various temperatures and after various crosslinking times. The results are presented in table 4.

TABLE 4

| Time | Tensile strength (MPa)/Cohesion (%) | | |
| --- | --- | --- | --- |
| (min) | 135° C. | 150° C. | 200° C. |
| 5 | Noncrosslinked | Noncrosslinked | Noncrosslinked |
| 10 | Noncrosslinked | 0.9/100% | 2.6/100% |
| 15 | 0.9/100% | 2.1/100% | 2.7/100% |
| 20 | 1.4/100% | 2.2/100% | 2.7/100% |

According to the results in table 4, at 150° C. and 200 C. it is necessary to wait 10 minutes in order to achieve the crosslinking of a single-component ASE, that is to say for the test specimens then to be able to be handled.

The optima are obtained after 10 minutes at 200° C. and 15 minutes at 150°C.

The optimum tensile strength value measured at 150° C. corresponds to more than 80% of the maximum value recorded during the reference adhesive bondings. At 200° C., the values achieved are more than 90% of the reference value.

3/ Mechanical Properties

The typical values for the mechanical properties and their standards are represented in table 5. These characteristics were obtained after optimum crosslinking at 150° C. for 1 hour.

TABLE 5

| 1 h at 150° C. | Typical values |
| --- | --- |
| Shore A hardness (Standard ISO R 868, ASTM D2240) | 60 |
| Modulus at 100% elongation (MPa) (Standard ISO R 37(H2), ASTM D412) | 3.3 |
| Tensile strength (MPa) (Standard ISO R 37(H2), ASTM D412) | 5.5 |
| Elongation at break (%) (Standard ISO R 37(H2), ASTM D412) | 200 |

4/ Characteristics of Adhesion and Heat Resistance 4-1/ Adhesion to Test Specimen—Optimum Properties The test specimens for the adhesion test (standard MNRPS 748—seal with a thickness of 1 mm) were crosslinked at 150° C. for 1 hour, plus 24 hours of maturing at 23° C. and 50% relative humidity (Initial). A thermal aging is carried out at 250° C. for three days for the glass/stainless steel mixed adhesive bonding.

The tests below were carried out on the single-component ASE formulation (table 6).

TABLE 6

| 1 h at 150° C. Assemblage | Initially | | |
|---|---|---|---|
| | Alu/Alu | Stainless steel/ Stainless steel | Glass/ Stainless steel |
| Tensile strength (MPa) (Standard MNRPS 748) | 2.7 | 2.6 | 2.9 |
| Cohesion (%) (Standard MNRPS 748) | 100 | 100 | 100 |

4-2/ Adhesion to Test Specimen—Various Materials

The results for adhesion (standard MNRPS 748) initially, after heat treatment at 250° C. for 72 hours and after passing through wet heat at 80% relative humidity at 50° C. for 240 hours are combined in table 7.

The crosslinking conditions of 15 min at 150° C. (initially) are more suitable for the production rate of the assembly lines of clients and are thus more closely related to real applicational conditions.

TABLE 7

| 15 min at 150° C. Assemblages | | Tensile strength (MPa)/Cohesion (%) | | |
|---|---|---|---|---|
| | | Initially | 240 h at 80% RH and 50° C. | 72 h at 250° C. |
| Glass | Stainless steel | 2.8/100 | 3.4/100 | 2.3/100 |
| Glass | Aluminized sheet | 3.1/100 | 3.2/100 | 2.1/100 |
| Glass | Electro-galvanized sheet | 3.0/100 | 4.1/100 | 1.9/100 |
| Glass | Galvanized sheet | 3.2/100 | 3.4/100 | 2.3/100 |
| Stainless steel | Stainless steel | 3.0/100 | 3.1/100 | 1.9/100 |
| Aluminized sheet | Aluminized sheet | 2.8/100 | 3.1/100 | 2.0/100 |
| Electro-galvanized sheet | Electro-galvanized sheet | 3.4/100 | 3.6/100 | 1.9/100 |
| Galvanized sheet | Galvanized sheet | 3.4/100 | 3.6/100 | 2.1/100 |

After thermal aging for a maximum of 72 hours at 250° C. and wet heat, the tensile strength values measured on the single-component ASE formulation are still at least 1.9 MPa (see the values presented in table 7). As regards the failure facies, they are surface cohesive failures, that is to say that a fine film of elastomer remains on one of the two parts of the adhesive bond. This might have been worrying if the strength values had been low but, with a mean of 2.15 MPa, we can be certain of the good behavior of the product with regard to thermal stability.

4-3/ Adhesion of Angle Brackets to an External Window

An adhesive bonding is carried out which consists in assembling angle brackets made of stainless steel on an oven door made of screen-printed glass. The single-component ASE formulation was crosslinked at 150° C. for 15 minutes (table 8).

TABLE 8

| 15 min at 150° C. | Angle brackets on an oven door |
|---|---|
| Tensile strength (MPa) (Standard MNRPS 748) | 1.83 |
| Cohesion (%) (Standard MNRPS 748) | 100 |

After 15 minutes at 150° C., these values are entirely satisfactory for the application. The failure facies are 100% cohesive and the shear strength approaches 70% of the value recorded on test specimens after 1 hour at 150° C. (table 6).

5/ Stability

After storing for several months, at least 4 months, the single-component ASE formulation is not crosslinked and it is still possible to use it in the targeted applications, as is shown by the mechanical and adhesive properties after 4 months (tables 9 and 10).

TABLE 9

| | Single-component ASE (Initial) | Single-component ASE (at 4 months) |
|---|---|---|
| Shore A hardness (Standard ISO R 868, ASTM D2240) | 60 | 60 |
| Modulus at 100% elongation (MPa) (Standard ISO R 37(H2), ASTM D412) | 3.3 | 3.5 |
| Tensile strength (MPa) (Standard ISO R 37(H2), ASTM D412) | 5.5 | 3.9 |
| Elongation at break (%) (Standard ISO R 37(H2), ASTM D412) | 200 | 165 |

The test specimens for the adhesion test (standard MNRPS 748—seal with a thickness of 1 mm) were crosslinked at 150° C. for 1 hour, plus 24 hours of maturing at 23° C. and 50% RH.

TABLE 10

| Assemblage | Alu/Alu | Stainless steel/Stainless steel |
|---|---|---|
| | Single-component ASE (Initial) | |
| Tensile strength (MPa) (Standard MNRPS 748) | 2.7 | 2.6 |
| Cohesion (%) (Standard MNRPS 748) | 100 | 100 |
| | Single-component ASE (at 4 months) | |
| Tensile strength (MPa) (Standard MNRPS 748) | 3.2 | 2.7 |
| Cohesion (%) (Standard MNRPS 748) | 100 | 90 |

6/ Long-Term Thermal Aging

The results for adhesion (standard MNRPS 748) of the glass and stainless steel assemblage after long term heat treatment for 1000 hours at 180, 200 and 225° C. are combined in table 11.

TABLE 11

| | Heat treatment for 1000 hours | | |
| 1 h at 150° C. | 180° C. | 200° C. | 225° C. |
| --- | --- | --- | --- |
| Tensile strength (MPa) (Standard MNRPS 748) | 3.3 | 2.7 | 2.6 |
| Cohesion (%) (Standard MNRPS 748) | 100 | 100 | 50* |

*surface cohesion

7/ Discussions and Conclusions

All the results which are presented in tables 2 to 11 show that the single-component ASE formulation is well suited to the application of oven door adhesive bondings, in particular with regard to the rheological, adhesive and thermal stability properties, accompanied by rapid kinetics compatible with industrial rates.

What is claimed is:

1. An adhesive silicone elastomer composition which can be crosslinked under hot conditions by polyaddition (hydrosilylation), this composition being of the type of those comprising:
    α/ at least one PolyOrganoSiloxane (POS) carrying ethylenic and/or acetylenic unsaturation(s) {POS comprising ≡Si-[unsaturation] units};
    β/ at least one polyorganosiloxane (POS) carrying ≡Si—H units;
    γ/ a catalytic combination comprising:
        γ.1 at least one metal catalyst
        γ.2 and at least one crosslinking inhibitor;
    δ/ a filler;
    ε/ at least one adhesion promoter;
    ρ/ at least one POS resin;
    λ/ at least one agent for stability toward heat;
    φ/ optionally at least one other functional additive;
said composition being a single-component composition wherein the crosslinking inhibitor γ.2 is selected from the group of compounds of following formula (I) or (II):

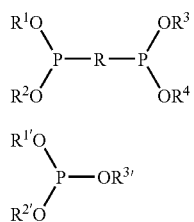

in which:
    R is identical or different, represents a linear, branched or cyclic alkylene radical or a substituted or unsubstituted arylene radical, in particular:
        i. a linear or branched alkylene radical having in particular from 2 to 30 carbon atoms (C),
        ii. an alkylene radical comprising one or more rings, in particular 1 or 2, it being possible for a ring to have in particular from 4 to 14 C, or
        iii. an arylene or alkylarylene radical comprising one or more fused or nonfused aromatic rings, in particular 1 or 2 rings, it being possible for a ring to comprise from 4 to 14 C, optionally substituted by 1 or more, in particular from 1 to 2, linear or branched alkylene(s) having in particular from 1 to 12 C and
wherein:
    R1, R2, R3, R4, R1', R2' and R3', which are identical or different represent a linear alkyl radical or a substituted aryl radical in particular;
        i. a linear or branched alkyl radical having in particular from 2 to 30 carbon atoms(c).
        ii. an alkyl radical comprising one or more rings, in particular 1 or 2, it being possible for a ring to have in particular from 4 to 14 C, or
        iii. an aryl or alkylarylene radical comprising one or more fused or nonfused aromatic rings, in particular 1 or 2 rings, it being possible for ring to comprise from 4 to 14 C, optionally substituted by 1 or more, in particular from 1 to 2, linear or branched alkyl(s) having in particular from 1 to 12 C
wherein the inhibitor γ.2 corresponds to either of the following formulae (III) or (IV):

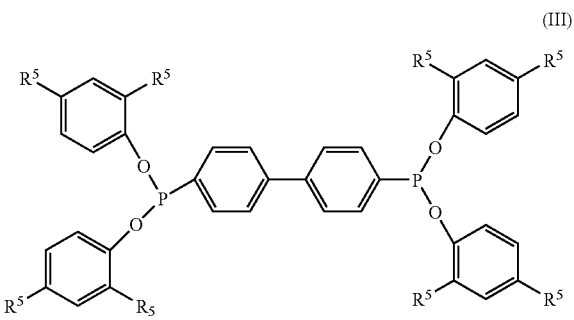

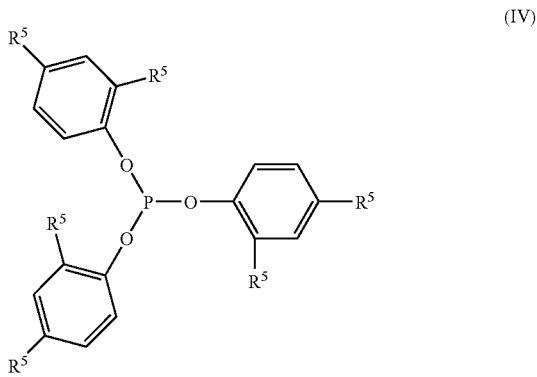

in which the $R^5$ radicals, which are identical or different, are linear or branched alkyls having in particular from 1 to 12 C.

2. The composition as claimed in claim 1, wherein the R radical of the formula (I) of the inhibitor γ.2 is a cyclic alkylene or an arylene radical.

3. The composition as claimed in claim 1, wherein the $R^1$, $R^2$, $R^3$, $R^4$, $R^{1'}$, $R^{2'}$ and $R^{3'}$ radicals of the formulae (I) and (II) of the inhibitor γ.2 are cyclic alkylenes, arylenes or alkylarylenes.

4. The composition as claimed in claim 1, wherein the inhibitor γ.2 corresponds to the formula (V) or (VI):

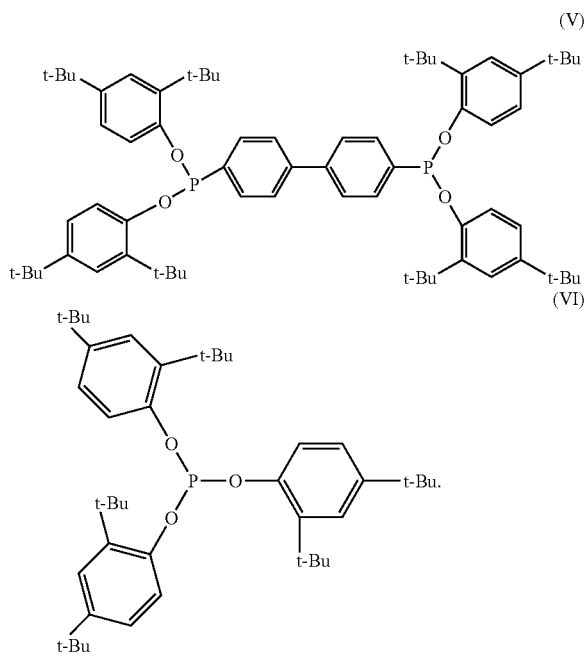

5. The composition as claimed in claim 1, wherein the catalyst γ.1 is a platinum catalyst.

6. The composition as claimed in claim 1, wherein the phosphorus of γ.2/platinum of γ.1 ratio by weight is such that: P/Pt≧1.

7. The catalytic composition as claimed in claim 5, wherein the catalyst γ.1 is a platinum/unsaturated siloxane complex.

8. The composition as claimed in claim 1, wherein:
the α POS or POSs comprise siloxyl units

and siloxyl units of formula:

the β POS or POSs comprise siloxyl units

and siloxyl units of formula:

in which formulae the various symbols have the following meaning:
the $R^6$ symbols, which are identical or different, each represent a nonhydrolyzable group of hydrocarbon nature, it being possible for this radical to be:
an alkyl radical having from 1 to 5 carbon atoms which can comprise from 1 to 6 chlorine atoms,
cycloalkyl radicals having from 3 to 8 carbon atoms which can comprise from 1 to 4 chlorine atoms,
aryl or alkylaryl radicals having from 6 to 8 carbon atoms which can comprise from 1 to 4 chlorine atoms,
cyanoalkyl radicals having from 3 to 4 carbon atoms;
methyl, ethyl, propyl, isopropyl, butyl, isobutyl, n-pentyl, t-butyl, chloromethyl, dichloromethyl, α-chloroethyl, α,β-dichloroethyl, β-cyanoethyl, γ-cyanopropyl, phenyl, p-chlorophenyl, m-chlorophenyl, 3,5-dichlorophenyl, trichlorophenyl, tetrachlorophenyl, o-, p- or m-tolyl, and xylyl, the Z symbols represent a $C_2$-$C_6$ alkenyl group;
n=an integer equal to 0, 1, 2 or 3;
x=an integer equal to 1, 2 or 3;
y=an integer equal to 0, 1 or 2;
the sum x+y lies within the range from 1 to 3,
w=an integer equal to 0, 1, 2 or 3.

9. The composition as claimed in claim 8, comprising:
α/—at least one POS exhibiting, per molecule, at least two $C_2$-$C_6$ alkenyl groups bonded to silicon;
β/—at least one POS exhibiting, per molecule, at least two hydrogen atoms bonded to silicon;
γ/—a catalytic combination as defined in claim 12;
ε/ an adhesion promoter,
δ/ an inorganic and/or microsphere and/or hollow and/or expanded and/or expandable inorganic filler;
ρ/ optionally at least one POS resin carrying T and/or Q, optionally M and/or D, siloxyl units and alkenyl-comprising siloxyl units,
λ/ optionally at least one colorant;
φ/ optionally at least one other functional additive.

10. The composition as claimed in claim 8 which is an RTV composition wherein its POS α and/or ρ constituent(s) is(are) chosen from alkenylsilyl POSs having a viscosity η at 25° C. such that:

200≦η200 000 mPa·s.

11. A process for the preparation of the composition as claimed in claim 1:
comprising preparing the catalytic combination γ:
either by mixing the inhibitor γ.2 with a solution/dispersion of catalyst γ.1,
or by mixing the catalyst γ.1 in a dispersion of the inhibitor γ.2 in a silicone oil,
and further comprising:
a) first of all mixing a portion of the constituents, with the exception of the catalytic combination γ;
b) heating, optionally under vacuum;
c) cooling;
d) and then adding the remainder of the constituents, except for the catalytic combination γ, with stirring to the premix thus obtained and, finally, adding the catalytic combination γ.

12. A method for adhesively assembling at least two elements comprising coating at least one of the elements to be assembled with a layer of an adhesive composition as claimed in claim 1, applying said elements against one another with said layer therebetween, and crosslinking said adhesive composition.

13. A method for adhesively assembling at least two elements consisting essentially of coating at least one of the elements to be assembled with a layer of an adhesive composition as claimed in claim 1, applying said elements against one another with said layer therebetween, and crosslinking said adhesive composition.

14. The method according to claim 12, wherein the crosslinking is carried out by heating.

15. The method according to claim 12, wherein the elements to be assembled are two in number.

16. The method according to claim 12, wherein one of the elements to be assembled is a woven, knitted or nonwoven fibrous material.

17. The composition as claimed in claim 1, wherein:
R is identical or different, represents a linear, branched or cyclic alkylene radical or a substituted or unsubstituted arylene radical, in particular:
i. a linear or branched alkylene radical having in particular from 2 to 12 carbon atoms (C), ii. an alkylene radical comprising one or more rings, in particular 1 or 2, it being possible for a ring to have in particular from 5 to 8 C, or
iii. an arylene or alkylarylene radical comprising one or more fused or nonfused aromatic rings, in particular 1 or 2 rings, it being possible for a ring to comprise from 6 to 8 C, optionally substituted by 1 or more, in particular from 1 to 2, linear or branched alkylene(s) having in particular from 4 to 12 C and wherein:
R1, R2, R3, R4, R1', R2' and R3', which are identical or different represent a linear alkyl radical or a substituted or unsubstituted aryl radical in particular:
i. a linear or branched alkyl radical having 2 to 12 C,
ii. an alkyl radical comprising one or more rings, in particular 1 or 2, wherein the rings have 5 to 8 C, or
iii. an alkyl or alkylarylene radical comprising one or more fused or nonfused aromatic rings, in particular 1 or 2 rings, comprising from 6 to 8 C, optionally substituted by 1 or more, in particular from 1 to 2, linear or branched alkyl(s) having in particular from 4 to 12 C.

18. An adhesive silicone elastomer composition which can be crosslinked under hot conditions by polyaddition (hydrosilylation), this composition being of the type of those comprising:
α/ at least one PolyOrganoSiloxane (POS) carrying ethylenic and/or acetylenic unsaturation(s) {POS comprising ≡Si-[unsaturation]units};
β/ at least one polyorganosiloxane (POS) carrying ≡Si—H units;
γ/ a catalytic combination comprising:
γ.1 at least one metal catalyst
γ.2 and at least one crosslinking inhibitor;
δ/ a filler;
ε/ at least one adhesion promoter;
ρ/ at least one POS resin;
λ/ at least one agent for stability toward heat;
φ/ optionally at least one other functional additive;
said composition being a single-component composition wherein the crosslinking inhibitor γ.2 is selected from the group of compounds of following formula (I) or (II):

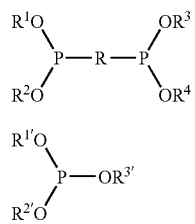

in which:
R is identical or different, represents a linear, branched or cyclic alkylene radical or a substituted or unsubstituted arylene radical, in particular:
i. a linear or branched alkylene radical having in particular from 2 to 30 carbon atoms (C),
ii. an alkylene radical comprising one or more rings, in particular 1 or 2, it being possible for a ring to have in particular from 4 to 14 C, or
iii. an arylene or alkylarylene radical comprising one or more fused or nonfused aromatic rings, in particular 1 or 2 rings, it being possible for a ring to comprise from 4 to 14 C, optionally substituted by 1 or more, in particular from 1 to 2, linear or branched alkylene(s) having in particular from 1 to 12 C and wherein:
R1, R2, R3, R4, R1', R2' and R3', which are identical or different represent a linear alkyl radical or a substituted aryl radical in particular:
i. a linear or branched alkyl radical having in particular from 2 to 30 carbon atoms (C),
ii. an alkyl radical comprising one or more rings, in particular 1 or 2, it being possible for a ring to have in particular from 4 to 14 C, or
iii. an aryl or alkylarylene radical comprising one or more fused or nonfused aromatic rings, in particular 1 or 2 rings, it being possible for a ring to comprise from 4 to 14 C, optionally substituted by 1 or more, in particular from 1 to 2, linear or branched alkyl(s) having in particular from 1 to 12 C wherein the catalyst γ.1 is a platinum/unsaturated siloxane complex,
wherein the catalytic combination γ comprises the following chemical entity (I'):

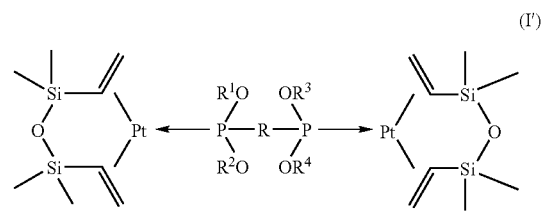

in which:
R is identical or different, represents a linear, branched or cyclic alkylene radical or a substituted or unsubstituted arylene radical, in particular:
i. a linear or branched alkylene radical having in particular from 2 to 30 carbon atoms (C),
ii. an alkylene radical comprising one or more rings, in particular 1 or 2, it being possible for a ring to have in particular from 4 to 14 C, or
iii. an arylene or alkylarylene radical comprising one or more fused or nonfused aromatic rings, in particular 1 or 2 rings, it being possible for a ring to comprise from 4 to 14 C, optionally substituted by 1 or more, in particular from 1 to 2, linear or branched alkylene(s) having in particular from 1 to 12 C and wherein:
R1, R2, R3, R4, R1', R2' and R3', which are identical or different represent a linear alkyl radical or a substituted aryl radical in particular:
i. a linear or branched alkyl radical having in particular from 2 to 30 carbon atoms (C),
ii. an alkyl radical comprising one or more rings, in particular 1 or 2, it being possible for a ring to have in particular from 4 to 14 C, or
iii. an aryl or alkylarylene radical comprising one or more fused or nonfused aromatic rings, in particular 1 or 2 rings, it being possible for a ring to comprise from 4 to 14 C, optionally substituted by 1 or more, in particular from 1 to 2, linear or branched alkyl(s) having in particular from 1 to 12 C.

19. The composition as claimed in claim 18, wherein the catalytic combination γ comprises the following chemical entity (III'):

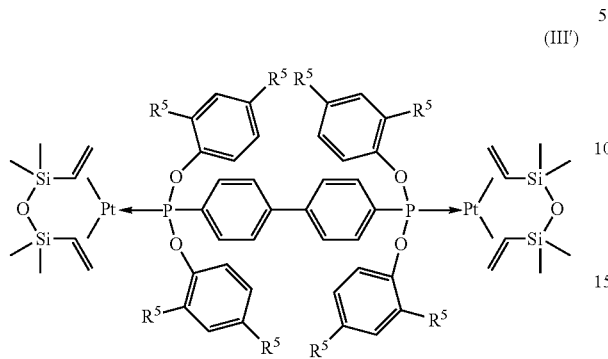

in which the $R^5$ radicals, which are identical or different, preferably identical, are linear or branched alkyls having in particular from 1 to 12 C.

20. The composition as claimed in claim 19, wherein the catalytic combination γ comprises the following chemical entity (V'):

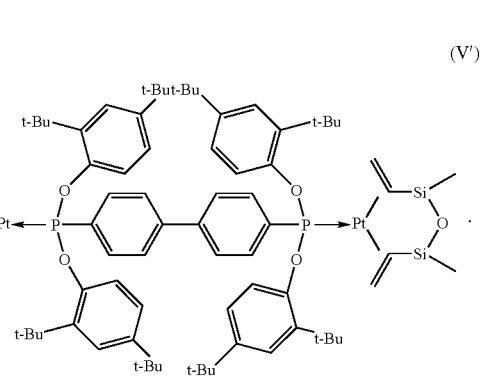

* * * * *